(12) United States Patent
Wizemann et al.

(10) Patent No.: US 7,457,094 B2
(45) Date of Patent: Nov. 25, 2008

(54) PROTECTION DEVICE FOR BUS SYSTEMS

(75) Inventors: Thomas Wizemann, Ludwigsburg (DE); Patrick Wenzler, Rheine (DE); Miguel Casares, Remseck-Pattonville (DE)

(73) Assignee: Robert Bosch GmbH, Stuttgart (DE)

(*) Notice: Subject to any disclaimer, the term of this patent is extended or adjusted under 35 U.S.C. 154(b) by 158 days.

(21) Appl. No.: 11/238,509

(22) Filed: Sep. 28, 2005

(65) Prior Publication Data
US 2006/0076978 A1 Apr. 13, 2006

(30) Foreign Application Priority Data
Sep. 28, 2004 (DE) .................. 10 2004 046 884

(51) Int. Cl.
*H02H 3/22* (2006.01)
*H02H 3/00* (2006.01)

(52) U.S. Cl. ..................... 361/111
(58) Field of Classification Search ............. 361/111, 361/127
See application file for complete search history.

(56) References Cited

U.S. PATENT DOCUMENTS

| | | | | |
|---|---|---|---|---|
| 5,978,244 A | * | 11/1999 | Hughey | 363/97 |
| 6,101,080 A | * | 8/2000 | Kuhne | 361/119 |
| 6,304,126 B1 | * | 10/2001 | Berthiot | 327/320 |
| 6,385,030 B1 | * | 5/2002 | Beene | 361/119 |
| 7,218,491 B2 | * | 5/2007 | Jaussi et al. | 361/56 |

* cited by examiner

*Primary Examiner*—Ronald W Leja
(74) *Attorney, Agent, or Firm*—Kenyon & Kenyon LLP

(57) ABSTRACT

An electrical protection device for bus systems, in particular having a two-wire design, including a bus-control unit and at least one device connected to a bus, the protection device being arranged in a central location on the bus and connected thereto.

8 Claims, 1 Drawing Sheet

PROTECTION DEVICE FOR BUS SYSTEMS

FIELD OF THE INVENTION

The present invention relates to an electrical protection device for bus systems, in particular for bus systems having a two-wire design.

BACKGROUND INFORMATION

Such bus systems are made up of a control device having a multicore line—in this case a two-wire design, in particular—to which devices such as, for example, up to 30 items having different functions but sharing a uniform interface are connected. In a two-wire bus system, the line, which is made up of only two wires, is used for different purposes simultaneously. For one, electrical energy for the supply of the connected devices is transmitted via the bus line and, for another, the bus line transmits data to the connected devices and from there to the control device.

Such a bus system is used in different application areas, for instance in the manufacturing industry, in households, motor vehicles, and many other places, and is exposed to a multitude of electrical and electromagnetic influences in the process. For instance, these influences generate so-called transients in the bus system, i.e., specific electrical pulses that have different amplitudes and frequencies and may influence the bus system in different ways by causing interference and malfunctions.

To protect against these transients, diodes, which shortcircuit these transients and thus prevent further damage to the devices, are utilized in each device connected to the bus, for instance. If irradiation of high-frequency electromagnetic effects occurs, it will be demodulated by the diodes. This produces a d.c. voltage on the bus line, which superimposes itself on the transmission voltages on the bus line and thus may cause interference. To reduce this effect, capacitors are connected in parallel to the diodes in each connected device. However, their capacitance must not exceed a certain relatively low value since this capacitance puts a capacitive load on the bus with each connected device. The frequency range of the irradiation interference to be attenuated is restricted as a result. The suppressing effect of such a capacitor through its capacitive resistance, which is inversely proportional to the frequency and capacitance, thus sets in at high frequencies only.

SUMMARY OF THE INVENTION

In contrast to the conventional designs, the protection device according to the present invention has the advantage that the protection device is arranged in a central location in the bus system and is connected thereto, so that fewer protective components are required in each device connected to the bus and the frequency range of the irradiation interference to be attenuated is increased.

A basic idea of the present invention will be explained in the following.

A bus system is equipped with only one protection device, which is connected in a central location. In this case the protection for the bus system against transients continues to be ensured in a central location. Only one central diode is required as protective component against transients. All capacitors, or at least a large portion of the overall capacitance, is concentrated in one location in parallel to the central diode, a capacitor having a much higher capacitance being used than would be possible in a decentralized configuration.

An important advantage of the present invention is that it considerably reduces the currently required effort; only one diode will be required while simultaneously retaining the protective effect and expanding, toward deeper frequencies, the frequency range of irradiation interference to be attenuated. Furthermore, the capacitance of a capacitor is considerably reduced in each connected device, resulting not only in economic advantages but in dimensional advantages as well.

Furthermore, this advantageously allows the basic capacitance of the central capacitor to be essentially constant, regardless of the number of connected devices, i.e., compared to the related art the effective frequency range to be attenuated is less dependent on the number of connected devices.

An electrical protection device for bus systems according to the present invention, in particular one having a two-wire design, which includes a bus control unit and at least one device connected to a bus, is characterized by the protection device being arranged in a central location on the bus and being connected thereto.

In a preferred refinement, the at least one connected device has a device-protection unit so that the frequency range to be attenuated is expanded in an advantageous manner.

In another preferred embodiment, the protection device has at least one protective diode and a protective capacitor, and the device-protection unit has a second capacitor, the capacitance of the second capacitor essentially being lower than the capacitance of the protective capacitor of the protection device. In this way, a high basic capacitance is arranged in a central location in the bus system, and a multitude of individual diodes and capacitors for each individual connected device is dispensed with, which results in an economic advantage.

Another embodiment provides that the protection device be arranged in a bus distributor. This utilizes the installation space available in the bus-distributor unit in an advantageous manner. No additional housing will be required.

In another design the protection device is arranged in the control unit of the bus. This design is advantageously suitable for a bus system that is not equipped with a bus-distributor unit.

The protection device may also be arranged in an individual connected device, which allows simple advantageous retrofitting of already existing bus systems, for instance for the purpose of expanding the bus system.

In another specific embodiment, the diode of the protection device has a high barrier layer capacitance. In this case the barrier layer capacitance of the diode acts in parallel to the central protective capacitor, so that its capacitance may be reduced.

DETAILED DESCRIPTION

Figure 1:
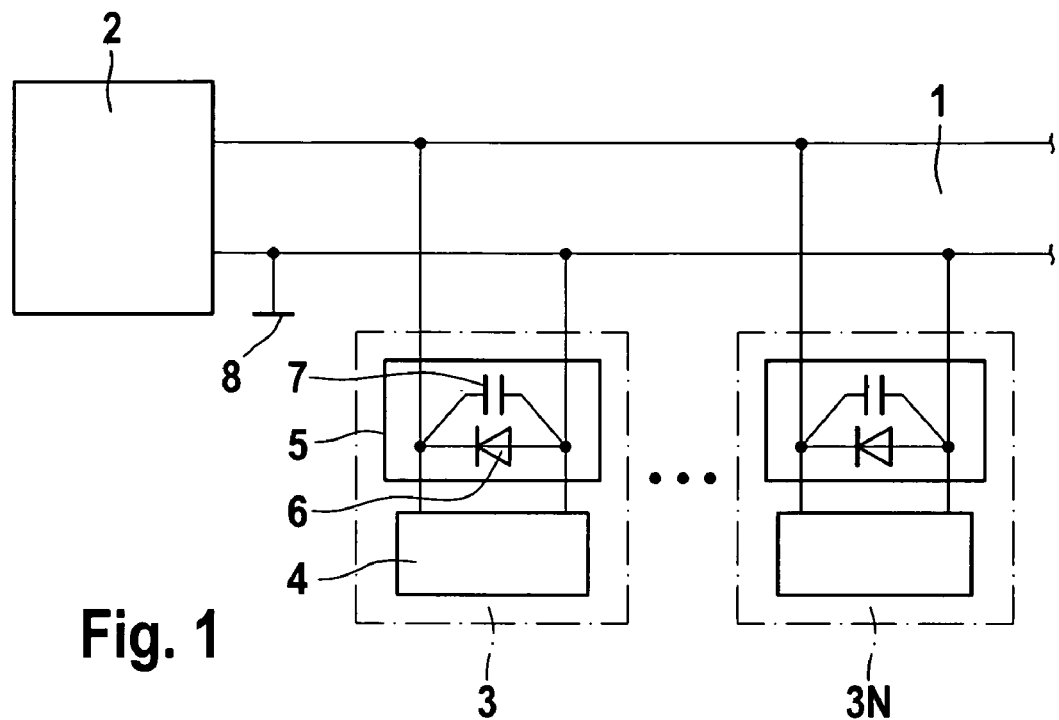
FIG. 1 shows a block diagram of a bus system having a two-wire design.

FIG. 1 shows a block diagram of a bus system configured according to the related art. The bus system has a bus control unit 2. Bus control unit 2 is connected to bus 1 which, in the example illustrated, is made up of a two-wire line. One of the two lines of bus 1 is connected to ground 8. Bus-control unit 2 carries out the control of the bus system in the conventional manner; it supplies voltage to devices 3, 3N connected to bus 1, transmits data thereto and receives data transmitted from devices 3, 3N, processes and/or forwards these data to higher-order evaluation units (not shown).

Furthermore, devices 3 to 3N are connected to bus 1 by two lines in each case. Device 3, 3N may have different functions such as a sensor function, and includes a device circuit 4 which is connected to the bus lines. These connecting lines run through a first device-protection unit 5. Inside device protection unit 5 the connection lines are connected to a diode 6 to which a capacitor is switched in parallel.

The anode of diode 6 is connected to ground 8 of the bus lines and connected in the non-conducting direction. Capacitor 7 has a capacitance in the order of magnitude of approximately 330 pF, which should not be exceeded in this embodiment. Each device 3, 3N is equipped with first device protection unit 5.

Transients present on the bus lines are short-circuited in devices 3, 3N by diodes 6 and thus prevented. Irradiated high-frequency voltages on the bus lines are demodulated by diode 6 and superimposed on the voltages on the bus lines. This effect is reduced by capacitors 7 but restricted to a relatively high frequency range as a result of the frequency dependency of each capacitor 7 and the low capacitance.

Figure 2:
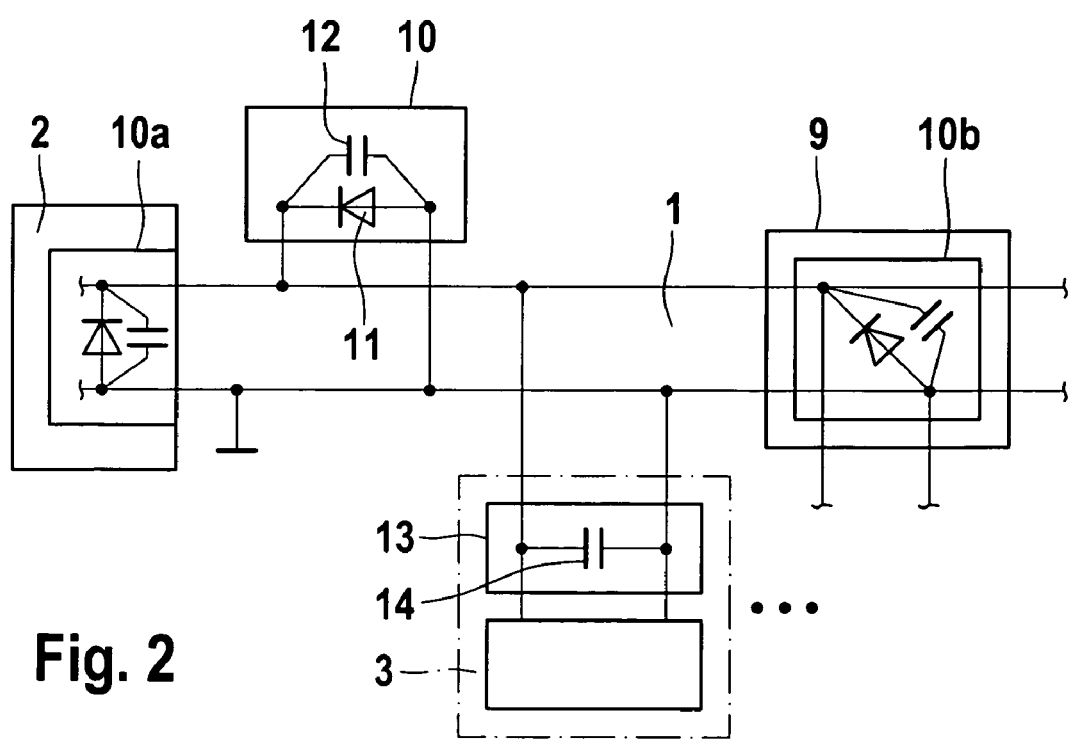
FIG. 2 shows an individual schematic circuit diagram of different specific embodiments according to the present invention of a protection device for the bus system of FIG. 1.

FIG. 2 shows a schematic circuit diagram of various specific embodiments of a protection device 10 according to the present invention for the bus system according to FIG. 1.

Protection device 10 is connected to the bus lines of bus 1 in a central location of the bus system. This central location is arranged at any-desired installation location of bus 1. Protection device 10 is located in a suitable housing, which is symbolized by a box indicated by a solid line. This housing is equipped with corresponding conventional connection devices for bus 1 (not shown).

Protection device 10 has a protective diode 11 and a protective capacitor 12, the capacitance of protective capacitor 12 being approximately ten times greater than that of conventional capacitor 7 of first device protection unit 5 and amounting to approximately 3.3 nF.

In this exemplary representation, only one connected device 3 is shown, but there may naturally be more as well, as indicated in FIG. 1. In this development, device 3 has a second device protection unit without a diode, with only a second capacitor 14. The capacitance of second capacitor 14 is within a range of approximately 120 pF, thereby also reducing its size compared to capacitor 7.

Protective capacitor 12 is basically a concentration of all capacitors that had been arranged in devices 3, 3N so far. As can be gathered from FIG. 1, all capacitors 7 are switched in parallel by the connection of first device protection units 5. This parallel connection of capacitors 7 results in an addition of all capacitance values, in addition to the capacitance of the bus lines of bus 1. It is clear here that the overall capacitance formed in this way depends on the number of devices 3, 3N connected to bus 1. The overall capacity may thus differ.

Since protection device 10 is connected to bus 1 at all times, the overall capacitance with this basic capacitance is essentially independent of the number of connected devices 3, 3N. This has the advantage that the frequency range to be attenuated is always a range that is defined by the basic capacitance.

Further installations locations of protection device 10 (10*b*) are shown in FIG. 2.

A central installation location is illustrated by reference numeral 10*a* for the protection device in bus-control unit 2. This embodiment of protective device 10*a* may be integrated in bus-control unit 2 so that an additional housing with further connection devices will not be required.

In the case where the bus system includes a bus distributor 9 which branches off additional bus lines from bus 1, protective device 10 may be arranged therein, which is denoted by reference sign 10*b*. An existing bus system may be expanded with the aid of bus distributor 9 and at the same time be equipped with protection device 10*b* which then appropriately protects the bus lines that are part of the expansion. In the simple design, devices 3N (not shown) connected to the expanded new bus lines may be realized together with second device protection unit 13.

The present invention is not limited to the exemplary embodiments described above, but is modifiable in a variety of ways.

For instance, it is conceivable that protective device 10 is also arranged in a device 3, 3N, although this design will be required only once per bus system. This may be the case, for example, when no bus distributor or no additional installation location is available.

In one specific embodiment, protective diode 11 may be designed in such a way that its barrier layer capacitance has a relatively high value. This allows a reduction in the capacitance and thus the size of protective capacitor 12.

LIST OF REFERENCE NUMERALS

1 bus
2 bus-control unit
3 . . . 3N device
4 device circuit
5 first device protection unit
6 diode
7 capacitor
8 ground
9 bus distributor
10, 10*a*, 10*b* protection device
11 protective diode
12 protective capacitor
13 second device-protection unit
14 second capacitor

What is claimed is:

1. An electrical protection device for a bus system, comprising:
   a bus-control unit connected to a bus; and
   at least one device connected to the bus, wherein the protection device is situated in a central location on the bus and connected thereto, the protection device including one protective diode and at least one protective capacitor in parallel to the protective diode;

wherein the at least one connected device includes a device-protection unit, wherein the device-protection unit includes a second capacitor, and wherein a capacitance of the second capacitor is lower than a capacitance of the protective capacitor.

2. The electrical protection device according to claim 1, wherein the protection device is situated in a bus distributor.

3. The electrical protection device according to claim 1, wherein the protection device is situated in the bus-control unit.

4. The electrical protection device according to claim 1, wherein the protection device is situated in an individual device.

5. The electrical protection device according to claim 1, further comprising a diode having a large barrier-layer capacitance.

6. The electrical protection device according to claim 1, wherein the bus system has a two-wire design.

7. The electrical protection device according to claim 1, wherein the bus system has a Class II bus.

8. The electrical protection device according to claim 1, wherein the bus system has a CAN bus.

* * * * *